United States Patent [19]

Priester, Jr. et al.

[11] Patent Number: 4,931,487

[45] Date of Patent: Jun. 5, 1990

[54] CHAIN EXTENDERS FOR POLYURETHANES

[75] Inventors: Ralph D. Priester, Jr., Lake Jackson, Tex.; Edwin J. Strojny, Harbor Springs; Debra H. Stutts, Midland, both of Mich.

[73] Assignee: Dow Chemical Company

[21] Appl. No.: 164,043

[22] Filed: Mar. 4, 1988

[51] Int. Cl.$^5$ .................. C08G 18/00; C08G 18/14
[52] U.S. Cl. .................... 521/163; 521/159; 528/61; 528/62; 528/63; 528/64; 528/68; 528/73; 528/76; 528/80; 528/81; 528/83; 528/84; 528/85; 252/182.15; 252/182.17; 252/182.23; 252/182.24; 252/142.28
[58] Field of Search .............. 528/61, 62, 63, 64, 528/73, 68, 76, 83, 84, 80, 81, 85; 521/163, 173, 176, 159, 167

[56] References Cited

U.S. PATENT DOCUMENTS

| | | | |
|---|---|---|---|
| 2,917,489 | 12/1959 | Gladding et al. | 528/63 |
| 3,194,793 | 7/1965 | Kogon | 528/68 |
| 3,216,975 | 11/1965 | Kunde et al. | 528/62 |
| 3,301,823 | 1/1967 | Gebm et al. | 528/62 |
| 3,361,844 | 2/1968 | Hoeschele | 528/61 |
| 3,399,151 | 8/1968 | Kaiser | 521/166 |
| 3,428,610 | 2/1969 | Kiebert | 528/64 |
| 3,437,624 | 4/1969 | Dawn et al. | 523/300 |
| 3,440,223 | 4/1969 | Pierce | 528/49 |
| 3,456,037 | 7/1969 | Hoeschele | 528/63 |
| 3,595,732 | 7/1971 | Tingerthal | 428/305.5 |
| 3,644,235 | 2/1972 | Gray | 521/163 |
| 3,655,597 | 4/1972 | Strassel | 521/51 |
| 3,697,483 | 10/1972 | Damusis | 525/458 |
| 3,808,209 | 4/1974 | Donald | 544/336 |
| 3,814,757 | 6/1974 | Donald | 544/336 |
| 3,860,052 | 1/1975 | Schroeder | 152/354 |
| 3,905,944 | 9/1975 | Finelli | 260/75 N H |
| 3,928,351 | 12/1975 | Donald | 544/336 |
| 3,940,371 | 2/1976 | Case | 260/77.5 A M |
| 3,959,149 | 5/1976 | Oda et al. | 260/77.5 R |
| 4,002,584 | 1/1977 | Takahashi et al. | 528/52 |
| 4,042,537 | 8/1977 | Dahm et al. | 521/128 |
| 4,053,446 | 10/1977 | Watabe et al. | 524/874 |
| 4,096,128 | 1/1978 | Frisch et al. | 528/54 |
| 4,107,151 | 8/1978 | Takahashi et al. | 528/54 |
| 4,139,501 | 2/1979 | Rudner et al. | 521/136 |
| 4,150,206 | 4/1979 | Jourquin et al. | 521/51 |
| 4,157,430 | 6/1979 | Hergenrother et al. | 521/137 |
| 4,218,543 | 8/1980 | Weber et al. | 521/51 |
| 4,246,425 | 1/1981 | Koike et al. | 560/47 |
| 4,269,945 | 5/1981 | Vanderhider et al. | 521/159 |
| 4,294,934 | 10/1981 | Grogler et al. | 521/160 |
| 4,317,889 | 3/1982 | Peolinsky, Jr. | 521/107 |
| 4,322,327 | 3/1982 | Yoshimura et al. | 524/507 |
| 4,327,204 | 4/1982 | Oyzaizu et al. | 528/61 |
| 4,348,512 | 9/1982 | Grogler et al. | 528/73 |
| 4,360,603 | 11/1982 | Grogler et al. | 521/159 |
| 4,410,667 | 10/1983 | Porter, Jr. et al. | 525/440 |
| 4,414,174 | 11/1983 | Kiempner et al. | 264/328.6 |
| 4,523,004 | 6/1985 | Lin et al. | 528/76 |
| 4,549,007 | 10/1985 | Lin et al. | 528/76 |
| 4,552,945 | 11/1985 | Alberino et al. | 528/62 |
| 4,677,136 | 6/1987 | Rasshofer et al. | 521/159 |

FOREIGN PATENT DOCUMENTS 1966562  3/1973  Fed. Rep. of Germany .

OTHER PUBLICATIONS

Dr. H. Kleimann & Dr. E. C. Prolingheuer, "New Amine Extenders for Polyurethane Elastomers" PMA Apr. 22, 1986.
Derwent Abstract 50971W/31.
Derwent Abstract 09082E/05.
Derwent Abstract 59812K/25.
Chemical Abstracts 87:86450c.
Nissen & Markovs, "Aromatic Diamines as Chain Extenders in RIM Urethane Elastomers" Journal of Elastomers & Plastics, vol. 15 (4/83).
Caraculacu, et al. "Heterocyclic Diamines & Polyurethanes" Die Angewandte Makromolekulare Chemie, vol. 116 (1983).
Koike et al. "An overview of Polyurethane Diamino Curing Agents" Research Lab of Ihara Chem. Indu. Co., Ltd.

*Primary Examiner*—John Kight, III
*Assistant Examiner*—Dennis R. Daley

[57] ABSTRACT

Polyurethanes are produced from compositions comprising at least one relatively high equivalent weight component and at least one chain extender selected from the group consisting of heterocyclic diamines, diaromatic disulfides, alkyl ethers of halogen-substituted aromatic diamines, polysubstituted alkyl diamines and alkyl acid esters of halogen-substituted diamino phenols of designated structures. Polyurethanes having high thermal stability, high tear strength and high modulus are produced.

38 Claims, No Drawings

CHAIN EXTENDERS FOR POLYURETHANES

BACKGROUND OF THE INVENTION

This invention generally concerns the field of of polyurethane compositions. More specifically, it concerns chain extenders useful in polyurethane preparations, particularly chain extenders useful in polyurethanes prepared by reaction injection molding (RIM).

The term "polyurethane" is used generically herein to denote polymers produced by reaction of at least one polyisocyanate starting component and at least one polyfunctional active hydrogen containing starting component. Production of polyurethanes often involves more than one active hydrogen compound. When two or more active hydrogen components are used, at least one is generally a relatively high equivalent weight active hydrogen containing compound. Generally speaking, when incorporated into polyurethanes, relatively high equivalent weight active hydrogen compounds produce segments of polymer called soft segments, which segments have relatively low glass transition temperatures. Relatively low glass transition temperatures are those generally below the temperatures of intended use of a polyurethane.

Relatively low equivalent weight active hydrogen compounds, refered to herein as chain extenders, are often used in addition to the relatively high equivalent weight active hydrogen compounds in a polyurethane-forming composition. Chain extenders in polyurethanes generally produce high melting segments called hard segments, which are believed to result from an increased intermolecular association or bonding within the polymer. Intermolecular association or bonding can be by covalent or hydrogen bonds. An amount and type of chain extender is generally chosen to achieve preselected processing characteristics, preselected hardness and other preselected physical properties in a final polyurethane.

In reaction injection molding (RIM), chain extenders are chosen to impart desired physical properties to resulting molded objects and also to achieve a preselected reaction time, which is generally a reaction time sufficiently long to allow complete filling of a mold before gelling of the polymer, yet sufficiently fast to achieve short demold times. Demold times are typically 30 seconds to 2 minutes with a shot time, during which the components are injected into the machine, of about 5 seconds.

Reaction injection molding is a process for producing and molding polyurethanes, which process has proven especially useful for making large molded objects having resilience such as furniture items: light weight building materials; shoe soles and heels: industrial service parts such as rollers, gears, bearing pads, pump housings auto body parts such as bumpers, fascia, hoods, doors, and fenders and the like.

The RIM technique involves filling a mold with a stream of reactive, liquid starting components, which are rapidly injected. The starting components mix by impingement as they are injected into a mixing head, from which they flow rapidly into the mold. On mixing, the components quickly begin to react to form polyurethanes, including those having urea bonds. The mixture should remain fluid for a period of time sufficient to fill the mold, which is often of large volume and complex design. The period of time required to fill the mold is the filling time. The period of time between initial mixing of starting components and the first visible reaction in the form of creaminess of the reaction mixture is called cream time. The period of time between initial mixing and formation of sufficient gel to solidify the polyurethane is called gel time. Shortly after gelling, the polyurethane cures to form a molded object having sufficient dimensional stability that it can be removed from the mold, leaving an empty mold for another injection of starting components. The time from injection until such an object is formed is called the demold time. The demold time is but one component of the cycle time, which is a measure of the time from one injection until a RIM machine is ready for the next injection of starting components. Cycle time includes time necessary for mechanical operations such as opening and closing a mold, time required for mold preparations such as removing flash left after demolding, applying external mold release agents, and the like.

Starting components enter the mold, gel, cure and are removed very rapidly. Typically, the mixed stream of components enters the mold at a rate of from about 20 to about 1200 pounds per minute (from about 9 to about 545 kilograms per minute). Typical gel times range from less than about one second to about fifteen seconds. Cycle times are typically from about three to about five minutes and with high speed equipment are often less than about two minutes. Every stage of the process is preferably optimized to achieve cycle times which are as short as possible.

When RIM is used in a one shot process of producing polyurethanes, the polyisocyanate starting component is supplied to the mixing head in one stream and the active hydrogen starting components are supplied in another stream. In a two shot process, a prepolymer is supplied in one stream while remaining active hydrogen components are supplied in the other. Prepolymers having isocyanate groups are included in the term "polyisocyanate component." The stream of polyisocyanate component(s) is referred to as the "A side", or "A component" while the stream containing the active hydrogen component(s) is referred to as the "B side", or "B component." Chain extenders, catalysts, and additives are typically blended and introduced in the B side, but in certain cases catalysts and some additives can be mixed into the "A side". In some instances a third or fourth stream is required to meter an active ingredient which is incompatible with, prematurely reacts with or otherwise cause difficulty with one or more of the other components of the polyurethane. The term "reaction mixture" as used herein refers to an admixture of at least one polyisocyanate component and at least one hydrogen component which will form a polyurethane. Additives are optionally included in a reaction mixture.

It is important in RIM that starting components be mixed in desired proportions and that they be mixed intimately. It is also important that inclusion of air in the molded product not be in visible bubbles or pockets. The mold must be filled completely. These and other requirements are met by processes known to those skilled in the art. Such processes include processes disclosed in U.S. Pat. Nos. 3,709,640; 3,857,550; 4,218,543; 4,298,701; 4,314,962; and U.S. Pat. No. 4,582,887, which are incorporated herein by reference. Additional description of RIM processes is found in Prepelka and Wharton, "Reaction Injection Molding in the Automotive Industry," *Journal of Cellular Plastics,* vol. 2, no. 2, pp. 87-98 (1975) and Knipp, "Plastics for Automobile Safety Bumpers," *Journal of Cellular Plastics,* pp. 76–84 No. 2 (1973).

Chain extenders have important effects on processes for producing polyurethanes, particularly on RIM processes. If a chain extender reacts too rapidly, the polyurethane reaction mixture may gel before a mold is completely filled or before a foam has reached its greatest volume. If the chain extender is too slow, each cycle time will be increased by the time necessary for the reaction mixture to react sufficiently to form a demoldable polyurethane. Those skilled in the art know that the reactivity of the chain extender must be appropriate for use with the other components of a polyurethane formulation to achieve desired reaction times. At the same time, the chain extender must act together with the other components of the reaction mixture to yield a polyurethane having the desired physical properties.

A number of chain extenders have been suggested for use in polyurethane formulations. Aromatic diamines having at least one linear alkyl substituent of one to three carbon atoms in a position ortho to an amine group, such as those disclosed in U.S. Pat. No. 3,428,610 and U.S. Pat. No. 4,218,543 are commonly used as chain extenders. Alkyl substituted methylene dianilines such as those disclosed in U. S. Pat. Nos. 4,294,934 and 4,578,446 may be used alone or in combination with the substituted aromatic diamines. Variations of substituted aromatic diamines such as the aromatic diamines having an electron withdrawing group disclosed in U.S. Pat. No. 4,523,004; the vicinal toluenediamine disclosed in U.S. Pat. No. 4,529,746; the dialkyl aromatic diamines disclosed in U.S. Pat. No. 4,526,905 and oxyethylated toluenediamines disclosed in U.S. Pat. No. 4,596,685 have been proposed for use as chain extenders in RIM produced polyurethanes. Combinations of chain extenders such as the combinations disclosed in U.S. Pat. No. 4,269,945 which include at least one primary amine have also been proposed for use in polyurethanes formed in RIM processes.

Combinations of reactivity and physical properties such as hardness, modulus and load deflection and the like imparted to resulting polyurethanes by known chain extenders are limited. It would be desirable, for instance, in situations involving large complex molds, to achieve the hardness attainable with some known substituted aromatic diamines yet to have somewhat slower reaction times to allow complete filling of molds. It is also desirable, in many applications, to produce unfilled polyurethanes having physical properties such as thermal stability and modulus generally associated with the use of fillers in polyurethanes produced from formulations including known chain extenders.

SUMMARY OF THE INVENTION

In one aspect, the invention is a process for producing polyurethane or polyurethane-polyurea polymers by polymerizing, in a reaction injection molding apparatus, a reaction mixture comprising (1) at least one polyisocyanate component; (2) at least one relatively high equivalent weight active hydrogen component: and (3) at least one chain extender selected from the group consisting of: (a) heterocyclic diamines having at least one ring nitrogen; (b) di(aromatic amine) disulfides; (c) alkyl ethers of halogen-substituted aromatic diamines; (d) polysubstituted alkyl diamines having at least one highly electronegative group geminate to each amine group; (e) alkyl acid esters of halogen substituted diamino phenols and mixtures thereof. The invention also encompasses the polyurethane or polyurethane-polyurea polymers so produced and motor vehicles having parts thereof formed of said polymers.

In another aspect the invention is a process for producing a polyurethane or polyurethane-polyurea by polymerizing a reaction mixture comprising (1) at least one polyisocyanate component; (2) at least one relatively high equivalent weight active hydrogen component; and (3) a chain extender selected from the group consisting of: (a) heterocyclic diamines having at least two ring nitrogens; (b) polysubstituted alkyl diamines having at least one highly electronegative group geminate to each amine group: and (c) alkyl acid esters of halogen substituted diamino phenols and mixtures thereof. The invention also encompasses the polyurethanes and polyurea so produced.

In another aspect, the invention is a composition of matter comprising (1) a relatively high equivalent weight polyfunctional active hydrogen compound and (2) a chain extender selected from the group consisting of: (a) heterocyclic diamines having at least one ring nitrogen; (b) polysubstituted alkyl diamines having at least one highly electronegative group geminate to each amino group; and (c) alkyl acid esters of halogen substituted diamino phenols and mixtures thereof.

In yet another aspect, the invention is a composition of matter comprising (1) a relatively high equivalent weight polyoxyalkylene polyol produced from oxiranes, and (2) at least one chain extender selected from the group consisting of: (a) heterocyclic diamines having at least one ring nitrogen; (b) di(aromatic amine) disulfides; (c) alkyl ethers of halogen-substituted aromatic diamines; (d) polysubstituted alkyl diamines having at least one highly electronegative group geminate to each amine group; (e) alkyl acid esters of halogen substituted diamino phenols and mixtures thereof.

The chain extenders used in this invention have reactivities appropriate for production of polyurethanes by a variety of processes and are particularly useful in RIM molding where reactivity must be sufficiently slow to allow complete filling of the mold, but sufficiently fast to produce a demolded product having desired physical properties in a short cycle time. The chain extenders used in the invention are useful for producing polyurethanes having relatively high heat stabilities and moduli.

DETAILED DESCRIPTION OF THE INVENTION

Chain extenders suitable for use in the practice of the invention include heterocyclic diamines having at least one ring nitrogen. The heterocyclic diamines are suitably pyridines, pyramidines, triazines or pyrazines. Preferred heterocyclic diamines have structures represented by Formula I:

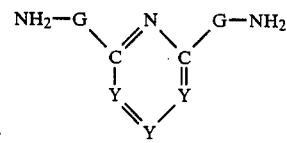

each Y is independently nitrogen or a =CR— group, wherein each R is independently hydrogen, an alkyl group or an aryl group which groups are unsubstituted or substituted with groups which do not interfere undesirably with polyurethane formation. At least one Y is a=CR—group. For use in applications other than RIM processes, preferably at most two of Y are =CR— groups. For use in RIM applications, all of Y are most preferably =CR— groups, and the chain extending compounds are diaminopyridines. Diamino pyridines are generally more soluble in other components used to form polyurethanes and polyurea in RIM processes. R is suitably a hydrogen, any alkyl group or any aryl group, but preferably R has a structure suitable for allowing the chain extenders to be dissolved in a relatively high molecular weight active hydrogen compound and suitable for formation of compact intermolecular arrangements in polyurethanes. Such preferred structures of R include hydrogen; phenyl groups; phenyl groups substituted by alkyl groups, ether groups, or secondary amine groups and the like, said groups having from about one to about three carbon atoms; and alkyl groups of from one to about twenty carbon atoms including methyl, ethyl, and isopropyl groups, and the like, which groups are optionally substituted by groups which do not interfere undesirably with polyurethane formation. R is most preferably a hydrogen or phenyl group. Most preferably, no more than one R is other than hydrogen.

Groups which do not interfere undesirably with polyurethane formation are functional groups which either do not react or interact with other functional groups on the same or different molecules in the reaction mixture or which do react or interact such that formation of polyurethanes having desirable properties are formed. The term "interact" is used herein to denote such processes as formation of complexes and the like. Generally, such groups as alkyl groups, aryl groups, cycloalkyl groups, ether groups, thioether groups, fluorine atoms, cyano and the like do not interfere undesirably with polyurethane formation.

In Formula I, each G is a covalent bond or a divalent bridging group, that is, each G is a covalent bond and the amine groups are bonded directly to the heterocylic ring, or each G is independently a group suitable for bonding at one position to the heterocyclic ring, and, at another position, bonding to an amine group, thus, linking each amine group to the heterocyclic ring. G is suitably selected from the group consisting of a covalent bonds, alkyl, aryl or alkylaryl groups which are unsubstituted or substituted by groups which do not interfere undesirably with polyurethane formation. G is, preferably, a covalent bond or an alkyl group; most preferably, G is a covalent bond. When G is an alkyl group, it is preferably an alkyl group of from about 1 to about 6 carbon atoms, preferably of from about 1 to about 4 carbon atoms such as a methylene group, ethylene group, n-propylene group, n-butylene group, 1-methyl-n-propylene group, 2-fluoro-n-propyl group, 2-cyano-n-propy group and the like. When G is an aromatic group it is preferably a phenylene group or a substituted phenylene group such as 2,3,5-trifluoro-1,4-phenylene, 2-trifluoromethyl-1,4-phenylene and the like. When G is an alkylaryl group it is preferably an alkylphenyl group such as are represented by —(CH$_2$-)$_v$—C$_6$H$_4$— where v is preferably an integer of from about 1 to about 6, preferably from about 1 to about 4.

Suitable heterocyclic diamines include 2,6-diamino pyridine; 2,3-diaminopyridine; 2,4-diaminopyridine; 2,5-diaminopyridine; 2,6-diamino-3-methyl pyridine; 2,6-diamino-4-methylpyridine; 2,3-diamino-4-methylpyridine; 2,3-diamino-5-methylpyridine; 2,3 diamino-6-methylpyridine; 2,4-diamino-6-methylpyridine; 2,4-diamino-3-methylpyridine; 2,5-diamino-3-methylpyridine; 2,5-diamino-4-methylpyridine; 2,5-diamino-6-methylpyridine; 2,6-diamino-3-ethylpyridine; 2,6-diamino-4-ethylpyridine; 2,3-diamino-4-ethylpyridine; 2,3-diamino-5-ethylpyridine; 2,3-diamino-6-ethylpyridine; 2,4-diamino-6-ethylpyridine; 2,4-diamino-3-ethylpyridine; 2,5-diamino-3-ethylpyridine; 2,5-diamino-4-ethylpyridine; 2,5-diamino-6-ethylpyridine; 2,6-diamino-4-isopropylpyridine; 2,6-diamino-3,5-dimethylpyridine; 2,6-diamino-3,4,5-trimethylpyridine; 2,6-diamino-3-isopyropyl-4-methylpyridine; 2,6-diamino-4-octadecyl-pyridine; 2,6-diaminopyrazine; 2,5-diaminopyrazine; 2,4-diaminopyrimidine; 2,5-diaminopyrimidine; 4,5-diaminopyrimidine; 4,6-diaminopyrimidine; 2,4-diamino-triazine; 2,6-diamino-3-ethylpyrazine, 2,6-diamino-3-methylpyrazine; 2,6-diamino-3-phenylpyrazine; 2,6-diamino-3-isopropylpyrazine; 2,5-diamino-3-ethyl-pyrazine: 2,5-diamino-3-methylpyrazine; 2,5-diamino-6-methylphenylpyrazine; 2,5-diamino-6-ethylpyrimidine; 4,6-diamino-2-isopropylpyrimidine; 2,6-diamino-4,5-dimethylpyridine; 2,5-diamino-3,6-dimethylpyrimidine; 2,6-diamino-4-isopyropyl-5-methylpyrimidine; 2,4- diamino-6-phenyltriazine; 2,4-diamino-6-ethyltriazine; 2,4-diamino-6-(p-methylphenyl)triazine; 2,4-diamino-6-isopropyltriazine:; 2,4-diamino-6-dodecyltriazine; α,α'-diamino-6-chloro-α,α'-dimethyl-1,3,5-triazine-2,4-propanenitrile; and the like.

Some pyridines represented by Formula I are commercially available. Pyridines represented by Formula I can generally be prepared by amination of pyridine with alkali metal amides as reviewed by Pozharskii, Simonov and Doran'Kin in *Russian Chem. Ref.*, 47. 1042–1060 (1978). Alternatively, the pyridines can generally be prepared by condensation of ammonia and dicyano compounds by the method of P. D. Cook and R. K. Robins, *J. Org. Chem.* vol. 43, 289 (1978) from commercially available materials. Alternatively, they can be prepared by the process taught by F. Johnson, et al in *J. Org. Chem.* vol. 27, pp. 2473–78 (1962) for preparation of pyridines from dinitriles. Alternatively, pyridines can be prepared from potassium cyanide by the method of Bak and Kaas taught in *Acta Chem. Scan.*, 12. pp. 995–998 (1958). These articles on preparation of pyridines are incorporated herein by reference.

Derivatives of 2,4-diaminopyramidines are prepared from cyanoguanidine and ketones by the reaction taught by E. J. Modest, S. Chatterjee and H. Kangur Protopapa in *J. Org. Chem.*, vol. 27, 2708 (1962) and vol. 30, 1837 (1965), which is incorporated herein by reference. Other pryamidines corresponding to Formula I, are prepared by the reaction of formyl formamidine with active methyl compounds as taught by H. Bredereck et al. in *Berichte*, 95. 804 (1962) and 98. 3883 (1963) and by D. J. Brown in *The Pyrimidines*, A. Weissberger, ed., Interscience Publishers, Inc., New York, 1962. These references to preparation are incorporated herein by reference.

Pyrimidine structures represented by Formula I are also prepared by condensation of 3-ketonitriles with guanidine. The 3-ketonitriles are prepared by dimerization of nitriles using a strong base followed by hydrolysis. Alternatively, a dinitrile is dimerized and reacted with guanidine in one step.

Pyrazine structures represented by Formula I can be prepared by the method of preparing iodopyrazines and modifying them taught by Hirschberg and Spoerri in *J. Org. Chem.*, 26 1907–12 (1961), the teachings of which are incorporated by reference. Alternatively, substituted diamino pyrazines are prepared by the methods of preparing N,N-dimethyl-substituted-pyrazinyl formamidines and hydrolysis thereof as taught by Cragoe, et al. in U.S. Pat. Nos. 3,299,063; 3,341,540 and U.S. Pat. No. 3,487,082 which are incorporated herein by reference. Other methods useful in preparing diamino pyrazines used in the practice of the invention are taught by Donald in U.S. Pat. Nos. 3,808,209, 3,814,757; 3,928,351 and U.S. Pat. No. 3,948,895, which are incorporated herein by reference. In the methods of Donald, cyanopyrazines are reduced to aminopyrazines. Remaining cyano groups are then converted to other groups. Alternatively, Donald also teaches preparation of substituted diaminopyrizanes from carboxypyrazines and nitropyrazines. Diaminopyrazines having halogen substituents can be prepared by the method of Allison et al. described in British Pat. No. 1,342,598, which is incorporated herein by reference.

Triazine structures represented by Formula I are generally prepared by the trimerization of nitriles in the presence of acids as taught by Grundmann, Weise, and Seide in *Justus Liebigs Ann. Chem.*, 577, 77 (1952). Other methods are given in *The Chemistry of Heterocyclic Compounds*. A Weissberger, ed., Vol. 13, "S-Triazines and Derivatives," by E. M. Smolin and L. Ropopert, Interscience Publishers, New York, (1959), pp. 17–45. These references to preparation are incorporated herein by reference.

When the chain extender is a di(aromatic amine) disulfide it preferably is a structure represented by Formula II:

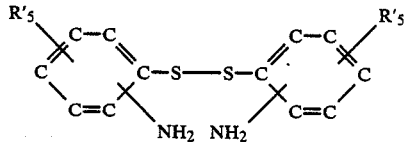

wherein each R' is independently hydrogen, an alkyl group having from one to about three carbon atoms, or an aryl group. The groups are optionally substituted with groups which do not interfere undesirably with polyurethane formation. Preferably, at least about 6 R' groups are hydrogen and the remainder are selected from the group consisting of hydrogen and alkyl groups of from one to about three carbon atoms. When an R' is an alkyl group, that alkyl group, preferably, has from about one to about two carbon atoms. When an R' is an aryl group, that group is preferably a phenyl group or a phenyl group substituted with groups which do not interfere undesirably with polyurethane formation. Such groups include alkyl groups, ether groups, thioether groups, flourine atoms, and the like. Preferably, all the R' groups are hydrogen. Beneficially, at least one of the NH$_2$ (amine) groups is para to the —S—S— (disulfide) group. Preferably, both amine groups are para to the disulfide group. Structures having amine groups para to the disulfide group are believed to form more compact intermolecular arrangements, which arrangements are associated with properties of thermal stability in resulting polyurethanes.

Exemplary diaromatic disulfides include di(p-aminophenyl) disulfide; di(2-methyl, 4-aminophenyl) disulfide: 4,3'-diamino diphenyldisulfide: 4-amino, 5-methylphenyl, 3'-amino, 4'-methylphenyl disulfide; and the like.

Diaromatic disulfide structures represented by Formula II are generally prepared by reduction of sulfonyl halides as taught by Alper in *Angewandte Chem., International Ed.*, vol 8, 677 (1969) and by Chan, Montiller, Van Horn and Harpp in *J. Amer. Chem. Soc.*, 92, 7224 (1970), which articles are incorporated herein by reference. The diaromatic disulfides can also be prepare by oxidation of mercaptans as taught by Walace, Schriesheim and Buntok in *J. Org. Chem.*, 28, 1311 (1963), which article is incorporated herein by reference. Aditional preparations are taught in *Organic Chemistry of Bivalent Sulfur*, Chemical Publishing Co., New York, 1958, 1963, vol. 1, pp. 21 –35 vol. 3 pp. 362–462, and vol. 5, pp. 27–34, which references are incorporated by reference.

When the chain extender is an alkyl ether of a halogen-substituted aromatic diamine it preferably has a structure represented by Formula III:

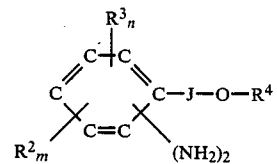

wherein m is an integer in the range of about 0 to about 2 and n is an integer in the range of about 1 to about 3, such that the sum of n and m is 3, J is a covalent bond or —CH$_2$—; each R$^2$ is independently hydrogen, an alkyl group having from one to about three carbon atoms, or an aryl group: each R$^3$ is independently a halogen-substituted alkyl group or a halogen atom; and R$^4$ is an alkyl group which is unsubstituted or substituted with groups which do not interfere undesirably with polyurethane formation. When an R$^2$ is an aryl group it is preferably a phenyl group, which phenyl group is optionally substituted with groups which do not interfere undesirably with polyurethane formation including alkyl groups, ether groups, thioether groups, fluorine atoms and the like. Each R$^2$ group is preferably hydrogen or an alkyl group. When an R$^2$ is an alkyl group, it is preferably an alkyl group of one to about two carbon atoms, which alkyl groups are optionally substituted with groups which do not interfere undesirably with the formation of polyurethanes.

In Formula III, each R$^3$ is preferably a perhalogenated alkyl group, having no hydrogen atoms attached thereto. The perhalogenated alkyl group preferably has from one to about 20 carbon atoms, more preferably from one to about 8 carbon atoms and most preferably from one to about 3 carbon atoms. Halogen atoms which comprise R$^3$ or which are substituted therein are suitably chlorine, bromine, or fluorine and are preferably chlorine or fluorine, more preferably fluorine. Such perhalogenated alkyl groups include such perfluoro groups as perfluoromethyl, perfluoroethyl, perfluorononyl and the like, such perchloro groups as perchloromethyl, perchloroamyl and the like, such perbromo groups as perbromodecyl and the like, such mixed halogenated groups as chlorodifluoromethyl, 1,1,1-trichloro-2,2-difluoroethyl, 3,3-dichloro-1,1,1,2,2-pentafluoro-n-propyl and the like. Each R$^3$ is more preferably a perfluoroalkyl group and is most preferably a perfluoromethyl group. Preferably, n is one and m is two.

R$^4$ in Formula III is suitably any alkyl group, and is preferably an alkyl group of one to about three carbon atoms. $R^4$ is optionally substituted by groups which do not interfere undesirably with the formation of polyurethanes. $R^4$ is more preferably a methyl or ethyl group which is optionally substituted by groups which do not interfere undesirably with polyurethane formation, which groups are preferably halogens, preferably chlorine or fluorine, more preferably fluorine. $R^4$ is most preferably an unsubstituted ethyl group, a perfluoromethyl or perfluoroethyl group. While the amine groups in Formula III are suitably located on any two ring positions, each is preferably adjacent to (ortho to) the ether group ($J-O-R^4$).

Alkyl ethers of aromatic diamines useful as chain extenders of the invention include 2,6-diamino-4-trifluoromethylphenylethyl ether: 2,6-diamino-4-pentafluoroethylphenylethyl ether; 2,6-diamino-5-trifluoromethylphenylethyl ether; 2,6-diamino-4-nonafluorotertiarybutylphenylethyl ether; 2,6-diamino-4-chlorodifluoromethylphenylethyl ether; 3,5-diamino-4-trifluorodichloroethylphenylethyl ether; 2,6-diamino-4-trifluoromethylphenylmethyl ether; 2,6-diamino-4-pentafluoroethylphenylmethyl ether; 2,6-diamino-5-trifluoromethylphenylmethyl ether; 2,6-diamino-4-nonafluorotertiarybutylphenylmethyl ether; 2,6-diamino-4-chlorodifluoromethylphenylmethyl ether; 3,5-diamino-4-trifluorodichloroethylphenylmethyl ether; 2,6-diamino-1-chloro-4-trifluoromethoxybenzene; 2,6-diamino-4-trifluoromethylphenylphenyl ether; 2,6-diamino-4-pentafluoroethylphenylphenyl ether; 2,6-diamino-5-trifluoromethylphenylphenyl ether; 2,6-diamino-4-nonafluorotertiarybutylphenylphenyl ether; 2,6-diamino-4-chlorodifluoromethylphenylphenyl ether; 3,5-diamino-4-trifluorodichloroethylphenylphenyl ether; and the like.

Some alkyl ethers of halogen-substituted aromatic diamines represented by Formula III are commercially available from Ihara Chemical Industry Co. Inc. The ethers can be prepared by processes taught by Miller in *Aromatic Nucleophillic Substitution*, American Elsevier, New York, 1968 and by Bunnette and Zahler in *Chem. Rev.* 49 272–412 (1951). Preparation of benzyl ethers such as those represented by Formula III is taught by Buton, et al. a *Nucleophilic Substitution at a Saturated Carbon Atom*, American Elsevier, New York, 1968. The teachings of these references are incorporated herein by reference.

Suitable polysubstituted alkyldiamines having at least three highly electronegative groups, each geminate to an amine group include those wherein the highly electronegative groups are halogen atoms perhaloalkyl groups, nitro groups or cyano groups. A perhaloalkyl group is preferably a perhalomethyl group whether alone or as part of a perhaloalkyl group, the halogens are suitably fluorine, chlorine or bromine with fluorine being preferred among the halogens. Preferred polysubstituted alkyl diamines are represented by Formula IV:

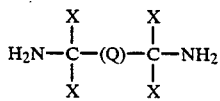

wherein Q is $-(CX_2)_q-$, or $-(CX_2)_r-Ar-(CX_2)_s-$; q, s and r are integers in the range of 0 to about 4 and each X group is independently Z or is a branched or straight chain alkyl group represented by the formula $-C_tZ_{(2t+1)}$, wherein each Z is independently hydrogen, a halogen, a perhalogenated methyl group, or a cyano group, and t is an integer in the range of 1 to about 2; wherein the X groups are selected such that at least one X geminate to each amino group is not hydrogen and Ar is divalent aromatic radical which is unsubstituted or substituted with groups which do not interfere undesirably with polyurethane formation.

Preferably, all X groups on a carbon atom to which an amine group is attached are other than hydrogen: and, more preferably, all of those X groups are alike. Q is preferably $(-CX_2-)_q$.

Preferably, all the Z groups are selected such that the chain extender does not condense with other chain extender molecules under conditions appropriate for urethane formation. When Z is a halogen or a perhalogenated methyl groups, suitable halogens include chlorine, bromine and fluorine. Suitable perhalogenated methyl groups include perfluoromethyl groups, perchloromethyl groups, chloro-difluoromethyl groups, dibromofluoro methyl groups and the like. The Z groups are perfluoro methyl groups preferably cyano groups, fluorine or, more preferably fluorine or perfluoromethyl groups.

In Formula IV, q, r and x are each preferably less than about three; preferably, q, r and s are in the range of zero to about two; and, more preferably, q, r and s are zero. In Formula IV, t is preferably less than about 4; more preferably, t is less than about 3; and, most preferably, t is zero.

Polysubstituted alkyldiamines suitable for use in the invention include tetrafluoro 1,2-ethylenediamine; tetrachloro-1,2-ethylenediamine; tetrabromo-1,2-ethylenediamine; tetracyano-1,2-ethylenediamine; tetra-trifluoromethyl-1,2-ethylenediamine; trichlorofluoro-1,2-ethylenediamine; trifluorochloro-1,2-ethylenediamine; trifluorocyano-1,2-ethylenediamine; 1,2-difluorocyano-1,2-ethylenediamine; symetricaldibromodicyano-1,2-ethylenediamine; hexafluoro-1,3-propylenediamine; hexachloro-1,3-propylenediamine; hexabromo-1,3-propylenediamine; hexacyano-1,3-propylenediamine; hexafluoro-1,2-propylenediamine; 1,2,2-trifluoro-1,2-propylenediamine; 1,3-dicyano-1,2,2,3-tetrachloro-1,3-propylenediamine; 1,3-dicyano-1,3-dichloro-1,3-propylenediamine; 1,3-dicyano-1,2-dichloro-1,3propylenediamine; perfluoro-2,3-diaminobutane; perfluoro-2,4-diaminobutane; 2,4,4-trifluoro-2,4-diaminobutane; 1,2,2,4,5,5,5,-heptachloro-1-cyano, 4-trichloromethyl-3-trifluoromethyl-3-aminodicyanomethyl, 1-aminopentane; and the like.

Poly substituted vicinal diamines represented by Formula IV can be prepared by the reaction of alkenes with cobalt-based catalysts as taught by Becker, White, and Bergman in *J. Amer. Chem. Soc.* (1980) 102 17), 5676–7 and by Becker and Bergman in *Organometallics*, 1983. 2(7), 787–96. Alkenes, including substituted alkenes are reacted with nitric oxide and (5-cyclopentadieny)(nitrosyl)cobalt to form complexes which are reduced using lithium aluminum hydride to form amines. Details of this process are also given in U.S. Pat. No. 4,328,164. The articles and patent are incorporated herein by reference. Alternatively, the compounds can be prepared by acidic hydrolysis of substituted diformylpiperazines as taught by Ginzburk, Kovalenko, and Marchenko in *Kim. Geterotsild. Soedin.* 1985 (9), 1265–6 and abstracted in *Chemical Abstracts* 105:78908h, which article and abstract are incorporated herein by reference. Yet another method of preparing the diamino compounds is the preparation of α,α-diaminosuccinic acids by hydrogenation of diaminomaleonitriles and hydrolysis of the resulting α,α-diaminosuccinonitrile, as taught in Japanese Kokai No. 74 81,316 issued Aug. 6, 1974 to Nakao, et al Kyowa Gas Chemical, and abstracted in *Chemical Abstracts* which patent and abstract thereof is incorporated herein by reference.

Compounds of Formula IV in which Q is —(CX$_2$)$_q$— and q is not zero can be made according to the teachings of Massoubre et al. in U.S. Pat. No. 3,235,538 which is incorporated herein by reference. Massoubre et al. teach bromination of diamines in aqueous suspensions generally in the presence of polymers. Those skilled in the art can modify the process suitably for other halogenation. Similarly, the process taught by Massoubre can be used to prepare compounds of Formula IV in which Q is —(CX$_2$)$_r$—Ar—(CX$_2$)$_s$ by application of the process to the products of reduction of such compounds as 1,4 phenylene diacetonitrile and 1,4-dicyanobenzene and the like by the process taught by Ruppoport in *The Chemistry of the Cyano Group,* Interscience, New York 1970, pages 307–340.

Alkyl acid esters of halogen-substituted diamino phenols for use in the practice of the invention are represented by Formula V.

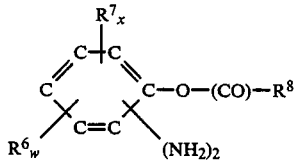

wherein w is an 1integer in the range of about 0 to about 2 and x is an integer in the range of about 1 to about 3, such that the sum of w and x is 3; R$^6$ is independently hydrogen, an alkyl group having from one to about three carbon atoms, or an aryl group, which alkyl or aryl groups are unsubstituted or substituted with groups which do not interfere undesirably with polyurethane formation: each R$^7$ is independently a halogen-substituted alkyl group or a halogen atom; and R$^8$ is an alkyl group which is unsubstituted or substituted with groups which do not interfere undesirably with polyurethane formation.

When an R$^6$ is an aryl group, it is preferably a phenyl group, which phenyl group is optionally substituted with groups which do not interfere undesirably with polyurethane formation including alkyl groups, ether groups, thioether groups, fluorine atoms and the like. Each R$^6$ group is preferably hydrogen or an alkyl group. When an R$^6$ is an alkyl group, it is preferably an alkyl group of one to about two carbon atoms, which alkyl groups are optionally substituted with groups which do not interfere undesirably with the formation of polyurethanes.

In Formula V, each R$^7$ is preferably a perhalogenated alkyl group, having no hydrogen atoms attached thereto The perhalogenated alkyl group preferably has from one to about 20 carbon atoms, more preferably, from one to about 8 carbon atoms, and, most preferably, from one to about 3 carbon atoms. Halogen atoms which comprise R$^7$ or which are substituted thereon are suitably chlorine, bromine, or fluorine and are preferably chlorine or fluorine, more preferably, fluorine. Such perhalogenated alkyl groups include such perfluoro groups as perfluoromethyl, perfluoroethyl, perfluorononyl and the like, such perchloro groups as per-chloromethyl, perchloroamyl and the like, such perbromo groups as perbromodecyl and the like, such mixed halogenated groups as chlorodifluoromethyl-1,1,1-trichloro-2,2-difluoroethyl-3,3-dichloro-1,1,1,2,2-pentafluoro-n-propyl and the like. Each R$^7$ is preferably a perfluoroalkyl group and is more preferably a perfluoromethyl group. Preferably, n is one and m is two.

R$^8$ in Formula V is suitably any alkyl group, and is preferably an alkyl group of one to about three carbon atoms. R$^8$ is optionally substituted by groups which do not interfere undesirably with the formation of polyurethanes. R$^8$ is more preferably a methyl or ethyl group which is optionally substituted by groups which do not interfere undesirably with polyurethane formation, which groups are preferably halogens, preferably chlorine or fluorine, more preferably fluorine. R$^8$ is most preferably an unsubstituted ethyl group, a perfluoromethyl or perfluoroethyl group. While the amine groups in Formula V are suitably located on any two ring positions, each is preferably adjacent (ortho) to the ester group (—O—(CO)—R$^8$).

Alkyl acid esters of diamino phenols useful as chain extenders of the invention include 2,6-diamino-4-trifluoromethylphenyl acetate; 2,6-diamino-4-pentafluoroethylphenyl propionate; 2,6-diamino-5-trifluoromethylphenyltrifluoromethylacetate; 2,6-diamino-4-nonafluorotertiarybutylphenyl perfluoroacetate; 2,6-diamino-4-chlorodifluoromethylphenylperfluoroacetate; 3,5-diamino-4-trifluorodichloroethylphenyl-perfluoropropionate; 2,6-diamino-4-trifluoromethylphenyl perchloroacetate; 2,6-diamino-4-pentafluoroethylphenyl-2-perfluoromethyl-perfluoropropionate; 2,6-diamino 5-trifluoromethylphenyl perchloropropionate; 2,6-diamino-4-nonafluorotertiarytrichloromethyl acetate; 2,6-diamino-4-chlorodifluoromethylphenyl perchloroacetate; 3,5-diamino-4-trifluorodichloroethylphenyl perfluorobutanate and the like.

Alkali acid esters of diamino phenols can be prepared by the processes taught by Patai in *The Chemistry of Carboxylic Acids and Esters,* Interscience Publishers, New York (1969) pp. 375–452; Smith, Moffatt and Khorana in *Journal of the American Chemical Society,* 80 (1958) p. 6204; and Marshall, Erickson and Folson in *Tetrahedron Letters* (1970) p. 4011.

Chain extenders are used as active hydrogen components in polyurethane formulations comprising active hydrogen components and polyisocyanate components. Chain extenders are generally admixed with other active hydrogen components and reacted with polyisocyanate components. In the case of RIM processes, the chain extenders are generally injected into a RIM apparatus with the B side components. Alternatively, the chain extenders are added in a separate stream. Additives are optionally used in polyurethane formulations incorporating the chain extenders of the invention. In the case of noncellular RIM elastomers, which are advantageously produced using the chain extenders according to the practice of invention, a nucleating gas may be used, but no additional blowing agent is generally necessary. Formulation of compositions for use in RIM and other polyurethane-producing processes to achieve polyurethane elastomers with properties suitable for given purposes is routine for those skilled in the art.

Chain extenders used according to the invention are suitably used in amounts effective to react with other A side components and B side components to produce solid polyurethanes. Preferably, sufficient chain extender is used to produce polyurethanes having preselected physical properties such as a hardness appropriate for a particular application and a thermal stability sufficient for that application. For instance, polyurethane car body parts, which are prepared by a RIM process, preferably have sufficient hardness to function as part of a car body and sufficient thermal stability to withstand various climates as well as the rigorous conditions of paint cure. If the part is, for instance, a support or fan housing, the polyurethane must withstand engine temperatures and not sag over prolonged use at those temperatures. In RIM applications, amounts of the chain extenders sufficient to achieve generally desirable thermal properties and hardness generally range from about 5 to about 55 parts by weight per hundred parts of relatively high equivalent weight compound. Preferably, the chain extenders are used in amounts ranging from about 5 parts to about 50 parts, more preferably from about 25 parts to about 45 parts per hundred parts by weight of total relatively high equivalent weight active hydrogen compounds. In elastomers and foams the chain extenders are suitably used in amounts of from about 2.5 to 20, preferably from about 3 to about 10 parts per hundred parts by weight based on total weight of relatively high equivalent weight active hydrogen compound.

Alternatively, chain extenders used in this invention are used in combination with other chain extenders, or relatively low equivalent weight active hydrogen compounds, useful in forming polyurethanes. Use in combination with other chain extenders includes use in admixture with other chain extenders. Admixtures of chain extenders including the chain extenders used in this invention are generally used in quantities of about 2.5 to about 100 percent by weight, desirably from about 5 to about 50 percent by weight and advantageously from about 12 to about 50 percent by weight of total chain extender based on total weight of relatively high equivalent weight active hydrogen containing compounds used in a polyurethane-forming, particularly a RIM, process. Those skilled in the art are familiar with adjusting the amount of chain extender to achieve desired physical properties such as stiffness, flexibility and the like. When used in combination with other chain extenders, chain extenders used in the invention are preferably used in amounts of at least about 10 percent, more preferably at least about 25 percent, by weight of total chain extenders used.

When, in the practice of the invention, a chain extender according to the invention is used in combination with at least one other chain extender, whether or not it is a chain extender according to the invention, a blend of chain extenders is formed prior to contact with the reaction mixture of active hydrogen component(s) and polyisocyanate component(s). Otherwise, crystallization and problems of nonhomogeneity occur when the relatively high equivalent weight active hydrogen compound(s) and, optionally, a catalyst are contacted.

Chain extenders used in this invention, when used in polyurethane formulations and processed by RIM technology typically produce polyurethane moldings having a modulus as measured by ASTM D 790 of from about 35,000 to about 300,000 pounds per square inch (psi) (from about 490,000 to about 2,000,000 kilopascals, kPa) without use of fillers. Preferably, the modulus of an unfilled polyurethane produced using the chain extenders of the invention is greater than about 70,000 psi, as measured according to ASTM D-790, at ambient temperature of about 20° C.

Polyurethanes produced using the chain extenders of the invention typically have relatively high thermal stabilities. Thermal or heat stability is measured by ASTM D 3769 or by use of a Dynamic Mechanical Thermal Analyser (DMTA) commercially available from Polymer Laboratories, Inc. The latter instrument plots graphs of temperature versus load deflection by measuring the deflection on a bar-shaped sample clamped in the machine and exposed to vibrational strain at increasing temperatures. Operation of the machine is in accordance with the instructions that accompany the machine. ASTM D 648 is a procedure for a similar measurement of heat distortion temperature or heat deflection temperature. The temperatures at which a material is distorted under a load or 66 psi and 264 psi is noted. Heat stability is generally considered high when it exceeds about 65° C. under 66 psi load.

A desirable heat stability varies with the intended application for a material. Chain extenders used in this invention are used in formulations designed to achieve a heat of distortion suitable for an intended application. Polyurethanes produced using the present invention preferably have distortion temperatures under 66 pounds per square inch (psi) loading of at least about 70° C., and, under 264 psi loading, at least about 170° F. or about 77° C. More preferably, the distortion temperature at loading for thirty minutes is at least about 270° F. Such distortion temperatures are most preferably achieved using formulations in which the polyisocyanate component is an aromatic diisocyanate and the relatively high equivalent weight active hydrogen component is an ethylene oxide capped trifunctional polyol or an amine terminated trifunctional polyol having a molecular weight from about 3000 to about 6000.

Tear strength of polyurethanes molded from formulations comprising the chain extenders of the invention are preferably at least about 110 kg/cm, more preferably greater than about 110 kg/cm.

Polyurethanes incorporating chain extenders used in this invention are polymers produced from at least one polyisocyanate starting component and at least two polyfunctional active hydrogen-containing starting components. Such active hydrogen components are compounds having at least two hydrogen-containing functional groups which will react with an isocyanate group. Active hydrogen-containing compounds include primary and secondary amines, alcohols, thiols, carboxylic acids, carboxamides and the like. The Zerewitnoff test described by Kohler et al. in the *Journal of the American Chemical Society*, Vol. 49, page 3181 (1927) predicts the tendency of a hydrogen-containing group to react with isocyanates. Compounds having hydroxyl, or primary or secondary amine functional groups are the active hydrogen compounds most often used in producing polyurethanes. Suitable active hydrogen compounds are generally liquids or solids capable of being melted at relatively low temperatures.

At least one of the active hydrogen components used in polyurethanes made in the practice of the invention is generally a relatively high equivalent weight polyfunctional active hydrogen-containing compound. A relatively high equivalent weight active hydrogen-containing compound generally has an equivalent weight in excess of about 400. Relatively high equivalent weight active hydrogen containing compounds advantageously have average equivalent weights of from about 500 to about 5000, preferably from about 800 to about 3000, and more preferably from about 1000 to about 2500. Desirably, the polyfunctional relatively high equivalent weight active hydrogen-containing compound has from about 2 to about 8, more preferably from about 2 to about 3, active hydrogen-containing groups per molecule. Active hydrogen components having equivalent weights of less than about 400 and used in forming elastomeric and RIM polyurethanes are generally referred to as chain extenders.

Chain extenders used in this invention are preferably mixed with polyfunctional relatively high equivalent weight active hydrogen-containing components for reaction with polyisocyanate components. Alternatively, the chain extender is prereacted with more than a stoichiometric amount of polyisocyanate component before reaction thereof with a relatively high equivalent weight active hydrogen component, or is reacted with a prepolymer or quasi prepolymer formed from a polyisocyanate and less than a stoichiometric amount of polyfunctional relatively high equivalent weight active hydrogen-containing compound.

Active hydrogen components suitable for use in forming polyurethanes include polyols, polyhydric thioethers, polyacetals, polyhydroxyl-containing phosphorus compounds, polyamines, polyamides, polymercaptans, polycarboxylic acids, and the like. Active hydrogen components are exemplified by those disclosed in U.S. Pat. No. 3,928,299.

Relatively high equivalent weight active hydrogen components most commonly used in polyurethane production are those compounds having at least two hydroxy groups, which compounds are referred to as polyols. Typical polyols include polyester polyols, polyester amide polyols, and polyether polyols having at least two hydroxyl groups. Polyethers and polyesters having hydroxyl terminated chains are preferred for use as relatively high molecular weight active hydrogen containing compounds for use in polyurethanes suitable for use in the practice of the invention. Examples of polyols also include hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers, including polythioethers, acetals, including polyacetals. Active hydrogen compounds other than aliphatic and aromatic polyols, include thiols including polythiols, ammonia and amines (including aromatic, aliphatic and heterocyclic amines, including polyamines and mixtures thereof). Alkylene oxide adducts of compounds having two or more different groups within the above-defined classes are also suitable for formation of polyurethanes; such compounds include amino alcohols, as well as compounds having at least one thiol group and at least one hydroxyl or amine group and the like.

Polyether polyols preferably employed in the practice of this invention are polyalkylene polyether polyols including the polymerization products of alkylene oxides, other oxiranes or other oxygen-containing heterocyclic compounds such as tetramethylene oxide in the presence of such catalysts as boron trifluoride potassium hydroxide and the like or initiated by water, polyhydric alcohols having from about two to about eight hydroxyl groups, amines and the like. Preferred polyols for use in the practice of this invention are polyether polyols produced from oxiranes, which polyether polyols have two carbons between oxygen atoms in the polyether chains. The carbons are, optionally, substituted by groups which do not undesirably interfere with polyurethane formation. Oxiranes used are all of one structure, e.g. propylene oxide, or mixed, e.g. propylene oxide and ethylene oxide. Illustrative alcohols suitable for initiating formation of a polyalkylene polyether include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, alpha-methyl glucoside, pentaerythritol, erythritol, pentatols and hexatols. Sugars such as glucose, sucrose, fructose, maltose and the like as well as compounds derived from phenols such as 2,2-di(4-hydroxyphenyl)-propane, and the like are also suitable polyhydric alcohols for forming polyether polyols useful in the practice of the invention.

Aromatic and aliphatic thiols suitably reacted with alkylene oxides and other oxiranes to form polyether polyols include alkane thiols such as 1,2-ethane dithiol, 1,2-propane dithiol and 1,6-hexane dithiol; alkene thiols such as 2-butene-1,4-dithiol; alkyne thiols such as 3-hexyne-1,6-dithiol; and arene thiols such as 1,4-benzene dithiol and the like. Hydrogen sulfide and thiol-containing polymers such as polyvinylbenzyl thiol and the like are also suitable.

Amines suitable for reaction with oxiranes to form polyether polyols include aromatic amines such as aniline, o-chloroaniline, p-phenylene diamine, 1,5-diaminonaphthalene, methylene dianiline, the condensation products of aniline and formaldehyde, 2,4-diamino toluene and the like: aliphatic amines such as methylamine, triisopropanolamine, isopropanolamine, diethanolamine, ethyenediamine, 1,3-propylenediamine, 1,4-propylene diamine, 1,3-butylenediamine, and the like and mixtures thereof. Amine based polyols are exemplified by those disclosed in U.S. Pat. No. 4,358,547.

Among other compounds suitably condensed with alkylene oxides for formation of polyether polyols are polyhydric thioethers such as thiodiglycol, and the like: polyhydroxyl-containing phosphorus compounds such as those disclosed in U.S. Pat. No. 3,639,542, those prepared from alkylene oxides and phosphorus acids advantageously having a $P_2O_5$ equivalency of from about 72 percent to about 95 percent; polyacetals (acetal resins) such as products of formaldehyde or other aldehydes with a polyhydric alcohol or oxirane, those derived from acetone or cyclic acetals and the like: acids and amides of acids such as difunctional fatty acids and fatty acid alkanol amides, and diacids, including hydroxystearic acid, dihydroxystearic acid, lauroyl monoethanolamide, adipic acid, terephthalic acid, and sulfonamides and the like. Compounds obtained by reacting thiodiglycol alone or in combination with other glycols, dicarboxylic acids, formaldehyde, aminocarboxylic acids or amino alcohols to form polythio-mixed ethers, polythio-ether esters or polythio-ether ester amides exemplify the use of combinations of hydrogen-containing compounds that may be reacted to form active hydrogen components suitable for use in the invention.

Exemplary oxiranes suitable for preparation of the polyether polyols include ethylene oxide, propylene oxide, butylene oxide, amylene oxide, styrene oxide, glycidyl ethers such as t-butyl glycidyl ether, phenyl glycidyl ether, and the like, as well as block or random copolymers of two or more of these oxiranes. Polyether polyols are also prepared from starting materials such as tetrahydrofuran and alkylene oxide copolymers with tetrahydrofuran: epihalohydrins such as epichlorohydrin; arylalkylene oxides such as styrene oxide and the like. Preferably, the polyether polyols are prepared from alkylene oxides having from about two to about six carbon atoms such as ethylene oxide, propylene oxide, and butylene oxide. Polyether polyols suitable for use in the practice of the invention are preferably selected from the group consisting of copolymers produced from mixtures of ethylene oxide and propylene oxide, and polymers of propylene oxide at least partially capped with ethylene oxide to provide primary hydroxyl groups. The polyether polyols preferably have from about 2 to about 3 hydroxyl groups per molecule. The polyether polyols may be prepared by processes known to those skilled in the art such as those processes described in *Encyclopedia of Chemical Technology*, Vol. 7, pp. 257–262, Interscience Publishers (1951); M. J. Schick, *Nonionic Surfactants*, Marcel Dekker, New York (1967): British Pat. No. 898,306; and U.S. Pat. Nos. 1,922,459; 2,871,219; 2,891,073; and U.S. Pat. No. 3,058,921.

Suitable hydroxyl-containing polyesters for use as relatively high equivalent weight active hydrogen compounds in the practice of the invention include those obtained from polycarboxylic acids or polycarboxylic acid anhydrides and polyhydric alcohols. The polycarboxylic acids and anhydrides are suitably aliphatic, cycloaliphatic, aromatic or heterocyclic; they are, optionally, substituted, e.g. by halogen atoms and are, optionally, unsaturated. Illustrative polycarboxylic acids include oxalic acid, malonic acid, succinic acid, glutaric acid, adipic acid, pimelic acid, suberic acid, azelaic acid, sebacic acid, oleic acid, trimellic acid, maleic acid, fumaric acid, glutaconic acid, alpha-hydro muconic acid, beta-hydromuconic acid, alpha-butyl-alpha-ethyl-glutaric acid, alpha-beta-diethylsuccinic acid, phthalic acid, isophthalic acid, terephthalic acid, hemimellitic acid, 1,4-cyclohexane-dicarboxylic acid and the like. Any suitable aromatic, aliphatic or heterocyclic polyhydric alcohol may be used. Exemplary polyhydric alcohols include ethylene glycol, 1,2-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, neopentyl glycol, 1,1,1-trimethylolethane, 1,1,1-trimethylolpropane, hexane-1,2,6-triol, tetraethyleneglycol, polypropylene glycol, alpha-methyl glucoside, pentaerythritol, sorbitol, quinitol, mannitol, and the like as well as compounds derived from phenols such as 2,2-di(4-hydroxyphenyl)propane, bis(4-hydroxyphenyl)sulfide, bis(4-hydroxyphenyl)sulfone and the like. Polyesters of lactones such as caprolactone and the like or hydroxycarboxylic acid such as hydroxycaproic acid and the like are also suitable active hydrogen containing components.

Other polyols suitable for use in the practice of the invention include polyacetones, hydroxy functional acrylic polymers such as polymers of hydroxyethyl acrylate, hydroxyethyl methacrylate, hydroxypropyl acrylate, hydroxypropyl methacrylate, and the like; polymers of ethylenically unsaturated carboxylic acids such as polymers of vinyl acetate like polyvinyl acetate and the like: hydroxyl-containing epoxy resins; urea-formaldehyde and melamine-formaldehyde resins; hydroxyl-containing polycarbonates, such as those prepared by the reaction of diols, such as 1,3-propanediol, 1,4-butanediol, 1,6-hexanediol, diethylene glycol, triethylene glycol or tetraethylene glycol, with diarylcarbonates, e.g. diphenylcarbonate, or phosgene; hydroxyl-containing polyurethanes; methylol resins; starches and other cellulosic polymers; esters of phosphoric, sulfonic, sulfuric and boric acid; polypeptides; polyamines such as polyethyleneimines, polypropyleneimines and condensation polymers of aniline and formaldehyde and the like; acrylamide polymers: amine-functional polyglycols; mercaptan-functional polyglycols and polyalkylene sulfides; carboxy-functional polymers such as polyacrylic acid and the like.

Representatives of the suitable polyols are generally known and are described in such publications as *High Polymers*, Vol. XVI, "Polyurethanes, Chemistry and Technology" by Saunder-Frisch, Interscience Publishers, New York, Vol. I, pp. 32–42, 44–54 (1962) and Vol. II pp 5–6, 198–199 (1964); *Kunstoff-Handbuch*, Vol. VII, Vieweg-Hochtlen, Carl-Hanser-Verlag, Munich, pp. 45–71 (1966); and *Organic Polymer Chemistry* by K. J. Saunders, Chapman and Hall, London, pp. 323–325 (1973); and *Developments in Polyurethanes*, Vol 1, J. M. Burst, ed., Applied Science Publishers (1978) pp. 1–76.

Polyols which contain high molecular weight addition or condensation polymers in a finely dispersed form or in solution are optionally used. Such polyols are obtained when polymerization reactions are carried out in situ in the polyols described above. Processes for the production of these polyols are described in U.S. Pat. Nos. 3,869,413; RE. 28,715; RE. 29,014: and U.S. Pat. No. RE. 29,118, which are incorporated herein by reference. For instance, polyethers may be modified with vinyl polymers, e.g., by the polymerization of styrene and/or acrylonitrile in the presence of the polyethers. Polyols having polyurethane or polyurea particles are also suitable. Polyols containing polymers or having polymer adducts are referred to as copolymer polyols.

Polyamines which are suitable for use as relatively high equivalent weight active hydrogen components in polyurethanes include polyether polyamines; polyester polyamines; amine-functional polymers such as amine functional acrylates, amine terminated acetal resins, amine terminated urethanes, amine containing polyesters, and the like. Suitable amines include those having terminal primary or secondary amine groups, those having terminal aromatic amine groups such as p-aminophenoxy groups and p-amino-m-methyl-N-phenyl carbamate groups and the like. Blends of amines with polyols are also suitably used as active hydrogen components. When amines are used as at least a portion of the active hydrogen component, polyurea and polyurea-urethane linkages are formed. Useful amines include polyoxyalkylene polyamines and cyanoalkylated polyoxyalkylene polyamines having molecular weights preferably from about 350 to about 10,000 and, more preferably, from about 400 to about 5000.

Amine-terminated polyethers are preferably used in the practice of the invention. Amine-terminated polyethers are prepared from the polyether polyols described above by amination thereof. Amination is described in U.S. Pat. Nos. 3,161,682; 3,231,619; 3,236,895; 3,436,359; 3,654,370 which are incorporated herein by reference. For amination, it is generally desirable that the terminal hydroxyl groups in the polyol be essentially all secondary hydroxyl groups for ease of amination. Secondary hydroxyl groups are introduced into a polyol produced from ethylene oxide by capping the polyol with higher alkylene oxides, that is, with alkylene oxides having more than two carbon atoms.

Generally, amination does not result in replacement of all the hydroxyl groups by amine groups. An aminated polyether polyol is selected to have a ratio of amine groups to hydroxy groups of from 0:1 to 1:0, depending on the physical properties desired in a resulting polyurethane. The amine groups are generally primary, but secondary amine groups may be formed. Beneficially, the amine-terminated polyols have an average molecular weight greater than about 200 and have an average of from about 2 to about 6 amine groups per molecule. In the case of amines, the term "functionality" is used herein to refer to the number of amine groups in the molecule. Advantageously, the amine-terminated polyols have an average molecular weight of at least about 350. Preferably, the aminated polyols have an average equivalent weight from about 1000 to about 2500. The process of utilizing aminated polyols disclosed in U.S. Pat. No. 4,530,941 and U.S. Pat. No. 4,444,910 illustrate processes for using such compounds. Those patents are incorporated herein by reference.

Particular relatively high equivalent weight active hydrogen components are selected to achieve properties desired in the polyurethane to be produced therefrom. Those skilled in the art know how to select active hydrogen compounds of the appropriate equivalent weight, and having the appropriate number and type of functional groups and other characteristics to achieve preselected properties. The relationship between the structure of the active hydrogen components and the properties of the resulting polyurethane is not significantly affected by the presence of the chain extenders of the invention. The components may be, thus, used essentially in a conventional manner to form polyurethanes.

Additional chain extenders which are optionally used in combination with the chain extenders of the invention generally have at least two functional groups having active hydrogen atoms suitable for reaction with available isocyanate groups to crosslink or extend polymer chains produced from polyisocyanates and active hydrogen compounds. Chain extenders are preferably difunctional, that is, they have exactly two functional groups containing active hydrogen per molecule. Mixtures of difunctional and trifunctional compounds are also useful. Suitable additional chain extenders include primary and secondary diamines, amino alcohols, amino acids, hydroxy acids, diols, glycols or mixtures thereof. Exemplary compounds include ethylene diamine, hydroxy amines such as ethanolamine, propanol amine, diethanol amine and the like. A chain extender is generally chosen to achieve desired physical properties such as hardness, toughness, and the like, in the molded object.

Advantageous chain extenders for use in combination with chain extenders of the invention include primary and secondary diamines which react readily with isocyanates. Such chain extenders include phenylene diamine, bis(3-chloro-4-aminophenyl)methane, 2,4-diamino-3,5-diethyl toluene, 2,6-diamine-3,5-diethyl toluene, trisecondary butanolamine, isopropanolamine, diisopropanolamine, N-(2-hydroxypropyl)ethylenediamine, N,N'-di(2-hydroxypropyl)ethylenediamine, dialkyl diaminobenzenes such as those disclosed in U.S. Pat. No. 4,526,905 and the like. Liquid mixtures of polyphenyl polymethylene-polyamines of the type obtained by condensing aniline with formaldehyde are also suitable, as are polyoxyalkylene polyamines such as those formed by aminating glycol initiated polyalkylene ethers, polyoxypropylene and the like. Amine chain extenders are generally sufficiently sterically hindered or chemically retarded to provide sufficient processing time in a RIM apparatus. Among diamine chain extenders, aromatic diamines having linear alkyl substituents of one to three carbon atoms in positions ortho to each amino group are generally advantageous.

Chain extenders having hydroxyl groups include low molecular weight aliphatic alcohols such as 1,4-butane diol, ethylene glycol, trimethylolpropane, diethylene glycol, 1,4-cyclohexanedimethanol, and the like: aromatic ring-containing diols such as bis-hydroxy-ethyl-hydroquinone, bisphenols, catechol, resorcinol and the like; amide or ester containing diols, amino alcohols and the like. Aliphatic diol chain extenders generally have a backbone of from 2 to 6 carbon atoms.

Aminated polyalkylene polyethers such as polyoxypropylene glycols and the like are particularly useful as chain extenders. Such polyalkylene polyethers beneficially have average amino hydrogen equivalent weights of from about 60 to about 110.

Polyisocyanate starting components suitable for use in the practice of the invention are organic compounds that contain at least two isocyanate groups. Such compounds are well known and readily available commercially. Polyisocyanate starting components include aromatic, aliphatic and cycloaliphatic polyisocyanates and combinations thereof. Representative polyisocyanates include diisocyanates such as m-phenylene diisocyanate, toluene-2,4-diisocyanate, toluene-2,6-diisocyanate, hexamethylene-diisocyanate, tetramethylene-diisocyanate, cyclohexane-1,4-diisocyanate, hexahydrotoluene diisocyanate (and isomers thereof), naphthylene-1,5-diisocyanate, 1-methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl,4,4'-biphenyl diisocyanate, 3,3'-dimethyldiphenylmethane-4,4'-diisocyanate and the like; triisocyanates such as 4,4', 4''-triphenylmethane triisocyanate, toluene-2,4,6-triisocyanate, and the like; tetraisocyanates such as 4,4'-dimethyldiphenyl-methane-2,2', 5,5'-tetraisocyanate, 4,4'-dicyclohexanediisocyanate, isophorone diisocyanate, isomers of each and the like; as well as other polyisocyanates such as polyphenylisocyanate and the like and mixtures thereof. Toluene diisocyanate, diphenylmethane-4,4'-diisocyanate, diphenylmethane-2,4'-diisocyanate and polymethylene polyphenylisocyanate are beneficial for use in the practice of the invention because of their availability and properties.

Polyisocyanates are typically prepared by phosgenation of polyamine precursors. For instance, polyphenyl polymethylene polyisocyanate is prepared by phosgenation of a aniline/formaldehyde condensation product. Crude polyisocyanates are also suitable for use in the practice of the invention. Such crude isocyanates include crude toluene diisooyanates obtained by phosgenation of a mixture of toluene diamines or crude diphenylmethylene diisocyanate obtained by phosgenation of crude diphenylmethylenediamine. Crude isocyanates are disclosed in U.S. Pat. No. 3,215,652.

Diisocyanates useful in the practice of the invention are, optionally, derivatized to form prepolymers or quasi prepolymers. In general, a modified polyisocyanate useful in the practice of the invention has a free isocyanate content of from about 1 to about 40 percent by weight. To form prepolymers, diisocyanate starting components are reacted with less than a stoichiometric amount of active hydrogen-containing component. Suitable active hydrogen-containing components include low molecular polyols, such as dipropylene glycol, propylene glycol, hydroxy esters and the like, higher molecular weight polyols such as polypropylene glycol and the like, and amines and the like. Relatively high molecular weight active hydrogen compounds are also suitably reacted with polyisocyanates to form prepolymers or quasi prepolymers useful in the practice of the invention. Suitably, the diisocyanates are reacted with from about 0.01 to about 0.5 equivalents of a polyol having a molecular weight below about 700; beneficially, with about 0.015 to about 0.25 equivalents of polyols having a molecular weight from about 130 to about 300 in the case of such polyols as propylene glycol, butylene glycol, and the like or with a polypropylene ether glycol having a molecular weight of about 130 to about 700. Prepolymers suitable for use in the practice of the invention are disclosed in U.S. Pat. No. 4,374,210 and U.S. Pat. No. 4,297,440 which are incorporated herein by reference. Carbodiimide and uretonimine modified derivatives of diisocyanates, particularly diphenylmethane diisocyanates, which have been modified by the addition of high molecular weight polyols such as polyether diols and triols having molecular weights of from about 1000 to about 8000 are also useful in the process of the invention.

The polyisocyanate starting component is used in a quantity which provides an isocyanate index for the reaction mixture of from about 70 to about 130, preferably from about 90 to about 125. The isocyanate index is the ratio of the number of isocyanate groups in the polyisocyanate component and the number of isocyanate-reactive groups in the active hydrogen starting components multiplied by 100.

One or more catalysts are beneficially used in making polyurethanes. Suitable catalysts include tertiary amines, such as, triethylenediamine, N-methyl morpholine, N-ethyl morpholine, diethyl ethanolamine, N-coco morpholine, 1-methyl-4-dimethylaminoethyl piperazine, 3-ethoxy-N-dimethylpropylamine, N,N-dimethyl-N',N'-methyl isopropyl propylene diamine, N,N-diethyl-3-diethylaminopropylamine, dimethyl benzylamine, triethylamine, tributylamine, bis(N,N-diethylaminoethyl)adipate, 2-methylimidazole, 1,4-diaza-bicyclo-(2,2,2)-octane and the like. Other suitable catalysts include tin compounds such as stannous chloride, tin salts of carboxylic acids such as dibutyltin di-2-ethyl hexoate, dibutyl tin dilaurate, dibutyltin diacetate, di-2-ethylhexyltin oxide, and the like, as well as other organo-metallic compounds such as compounds of lead, arsenic, antimony, mercury and bismuth and compounds disclosed in U.S. Pat. No. 2,846,408 and the like. Silamines having carbon-silicon bonds such as those described in German Pat. No. 1,229,290 including 2,2,4-trimethyl-2-silamorpholine and the like as well as basic nitrogen compounds such as tetraalkylammonium hydroxides, alkali metal hydroxides such as sodium hydroxide, alkali metal phenolates such as sodium phenolate, and alkali metal alcoholates, such as sodium methylate, hexahydrotriazines and the like are also useful catalysts. Mixtures of catalysts are also suitable.

Metal atom containing catalysts are generally used in a quantity of from about 0.001 to 0.5 percent by weight based on active hydrogen containing starting components. Amine catalysts are generally used in a quantity of from about 0.001 to 5 percent by weight based on active hydrogen containing starting components. Those skilled in the art are able to select a catalyst composition and amount suitable to accelerate the reaction between given starting components. Representative catalysts and details regarding their use are found in *Kunstoff-Handbuch*, Vol. VII, published by Vieweg and Hochtlen, Carl-Hanser-Verlag, Munich 1966, pp. 96–102. A catalyst is typically added to B-side components but is, alternatively, mixed with the A-side components.

Additives such as surface active agents, plasticizers, fillers, flame retardants, pigments, stabilizers such as antioxidants, fungistatic and bacteriostatic substances and the like are optionally used in polyurethanes. Additives are generally blended with the active hydrogen starting components in the "B side" of the RIM apparatus.

The process of the invention is suitably used for producing compact moldings or moldings nucleated by incorporation of gases into one or more components of a polyurethane. In making such moldings, no blowing agent other than incorporated gas is generally used. Alternatively, blowing agents are used to produce moldings having a compact surface and cellular interior. Suitable blowing agents for use in the practice of the invention include inorganic blowing agents such as water, organic blowing agents which are volatile at temperatures in the mold, and dissolved inert gases. Suitable organic blowing agents include acetone: ethyl acetate: halogen substituted alkanes such as methylene chloride, chloroform, ethylidene chloride, vinylidene chloride, monofluorotrichloromethane, azobis(isobutyloformamide), chlorodifluoromethane, dichlorodifluoromethane and the like; butane; hexane; heptane; diethyl ether; and the like. Gases inert to the starting components such as nitrogen, air, carbon dioxide and the like are also useful blowing agents. Compounds such as azides which decompose at temperatures present in the mold to produce gases such as nitrogen are also useful.

Surface active additives, including emulsifiers, foam stabilizers, cell regulating additives and the like, are optionally used, especially when a cellular product is desired. Suitable emulsifiers include sodium salts of ricinoleic sulfonates or of fatty acids, amine salts of fatty acids such as oleic acid diethylamine, stearic acid diethanolamine and the like. Other surface active additives include such compounds as salts of sulfonic acids such as dinaphthylmethane disulfonic acid; fatty acids such as ricinoleic acid; polymeric fatty acids; and the like. Useful foam stabilizers include water soluble polyether siloxanes, such as those having a polydimethylsiloxane group attached to a copolymer of ethylene oxide and propylene oxide and the like. Such compounds are disclosed in U.S. Pat. No. 2,764,565. Cell regulating additives include paraffins or fatty alcohols or dimethylpolysiloxianes and the like.

The following examples are only for purposes of illustrating the process and compositions of the invention and are not to be viewed as limiting the present invention. All parts and percentages are on a weight basis unless otherwise indicated. In the examples, RIM molding is done using an Admiral 400 Hp RIM machine rated at 40 pounds per minute (18 kilograms per minute) maximum polymer through-put when the weight ratio of A-side to B-side components is 1:1. The machine has two feed tanks referred to herein as the A side tank (for polyisocyanate components) and the B side tank (for active hydrogen components). The RIM machine has a mold cavity in the shape of a rectangle measuring 12×14×⅛ inches (4.7×5.5×0.28 centimeters (cm)).

EXAMPLE 1

Ten kilograms (kg) of terminally aminated, polyoxypropylene diol having an average molecular weight of about 2000, commercially available from Texaco under the trade designation Jeffamine ® D-2000; fifty-five kg of a glycerine initiated polypropylene triol end capped with ethylene oxide and having an average molecular weight of 5000; 4 kg of a terminally aminated, diol-initiated polyoxypropylene having an average molecular weight of about 400, available from Texaco under the trade designation Jeffamine ® D-400, and 45 kg of di(para-aminophenyl)disulfide are mixed in the "B side" tank of the machine with 100 grams (g) of dimethyl tin dilaurate catalyst commercially available from Witco Chemical Co. under the trade designation Foamrez UL-28. A blend of 10 parts by weight of a liquified 4,4'-methylenebis(phenyl isocyanate) in which a portion of the isocyanate groups have been converted to carbodiimide having an isocyanate equivalent weight (I.E.) of 143, and 90 parts of an isocyanate-terminated prepolymer prepared from the reaction of about 53 parts of 4,4'-methylenebis(phenyl isocyanate) with about 6 parts of a 50/50 (by weight) mixture of dipropylene glycol and tripropylene glycol and about 31 parts of a 4800 molecular weight polypropyleneoxy-polyethyleneoxy triol having about 18% by weight ethylene oxide content and about 83% primary hydroxyl groups with a hydroxyl equivalent weight of about 1662, the blend having an isocyanate equivalent weight of about 180, commercially available from The Dow Chemical Company under the trade designation Code 1287 is placed in the A side tank of the machine. Both sides are heated to 100° F. (about 38° C.) and injected into a mold preheated to 200° F. (about 93° C.) at an isocyanate index of 1.05 under a pressure of 2000 psig (13,800 kPa) for a shot time of about 2 seconds. After about 2 minutes a rectangle of polyurethane is sufficiently cured to be demolded.

The reactangle is post cured in an oven preheated to about 275° F. (135° C.) for about 30 minutes. After which time, the rectangle appears less brittle.

EXAMPLE 2

The process of Example 1 is repeated except that no Jeffamine D-2000 is used and 93 kg of the triol-initiated polypropylene glycol end capped with ethylene oxide, 7 kg of Jeffamine ® D-400 and 18 kg of di(para-aminophenyl)disulfide is used in the B side tank. A rectangle is demolded after 2 minutes. After postcuring for 35 minutes at 110° C., the rectangle appears less brittle.

EXAMPLE 3

The process of Example 1 is repeated using 19.2 kg of 2,6-diaminopyridine in place of the di(para-aminophenyl)disulfide. The molded rectangle is sufficiently cured to be demolded after about 2 minutes. After a post cure at 110° C. for 30 minutes, it appears less brittle.

EXAMPLE 4

The process of Example 2 is repeated using 7.6 kg of 2,6-diaminopyridine in place of the di(para-aminophenyl)disulfide. The molded rectangle is sufficiently cured to be demolded after about 2 minutes. After a post cure at 110° C. for 30 minutes, it appears less brittle.

EXAMPLE 5

The process of Example 1 is repeated using 19.2 kg of 2,4-diaminopyrazine in place of the di(para-aminophenyl)disulfide. The molded rectangle is sufficiently cured to be demolded after about 2 minutes. After a post cure at 115° C. for 30 minutes, it appears less brittle.

EXAMPLE 6

The process of Example 2 is repeated using 7.6 kg of 2,4-diaminopyrazine in place of the di(para-aminophenyl)disulfide. The molded rectangle is sufficiently cured to be demolded after about 2 minutes. After a post cure at 115° C. for 30 minutes, it appears less brittle.

EXAMPLE 7

The process of Example 1 is repeated using 19.2 kg of 2,4-diaminopyrimidine in place of the di(para-aminophenyl)disulfide. The molded rectangle is sufficiently cured to be demolded after about 2 minutes. After a post cure at 110° C. for 40 minutes, it appears less brittle.

EXAMPLE 8

The process of Example 2 is repeated using 7.6 kg of 2,6-diaminopyrimidine in place of the di(para-aminophenyl)disulfide. The molded rectangle is sufficiently cured to be demolded after about 2 minutes. After a post cure at 110° C. for 40 minutes, it appears less brittle.

EXAMPLE 9

The process of Example 1 is repeated using 28.1 kg of tetracyano ethylenediamine in place of the di(para-aminophenyl)disulfide. The molded rectangle is sufficiently cured to be demolded after about 2 minutes. After a post cure at 120° C. for 30 minutes, it appears less brittle.

EXAMPLE 10

The process of Example 2 is repeated using 11.2 kg of tetracyano ethylenediamine in place of the di(para-aminophenyl)disulfide. The molded rectangle is sufficiently cured to be demolded after about 2 minutes. After a post cure at 120° C. for 30 minutes, it appears less brittle.

EXAMPLE 11

The process of Example 1 is repeated using 32.9 kg of 2,6-diamino-4-phenyl-s-triazine in place of the di(para-aminophenyl)disulfide. The molded rectangle is sufficiently cured to be demolded after about 2 minutes. After a post cure at 125° C. for 30 minutes, it appears less brittle.

EXAMPLE 12

The process of Example 2 is repeated using 13.1 kg of 2,6-diamino-4-phenyl-s-triazine in place of the di(para-aminophenyl)disulfide. The molded rectangle is Sufficiently cured to be demolded after about 2 minutes. After a post cure at 125° C. for 30 minutes, it appears less brittle.

EXAMPLE 13

The process of Example 1 is repeated using 37.2 kg of 1-chloro-4-trifluoromethoxy-2,6-diaminobenzene in place of the di(para-aminophenyl)disulfide. The molded rectangle is sufficiently cured to be demolded after about 2 minutes. After a post cure at 130° C. for 45 minutes, it appears less brittle.

EXAMPLE 14

The process of Example 2 is repeated using 14.9 kg of 1-chloro-4-trifluoromethoxy-2,6-diaminobenzene in place of the di(para-aminophenyl)disulfide. The molded rectangle is sufficiently cured to be demolded after about 2 minutes. After a post cure at 130° C. for 30 minutes, it appears less brittle.

We claim:

1. A process for producing polyurethane or polyurethane-polyurea polymers by subjecting to a reaction injection molding process, a reaction mixture comprising (1) at least one polyisocyanate components: (2) at least one relatively high equivalent weight active hydrogen component; and (3) a diamine chain extender selected from the group consisting of: (a) heterocyclic diamines having a structure represented by Formula I:

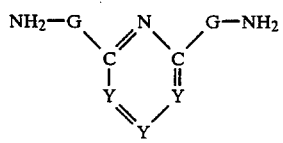

wherein each G is a divalent bridging group or a covalent bond; each Y is independently nitrogen or a =CR— group, but at least one Y is a =CR— group, wherein each R is independently hydrogen, an alkyl group or an aryl group which groups are unsubstituted or substituted with groups which do not interfere undesirably with polyurethane formation; (b) di(aromatic amine) disulfides; (c) alkyl ethers of halogen-substituted aromatic diamines having a structure represented by Formula III

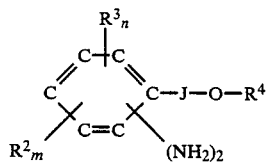

wherein m is an integer in the range of 0 to about 2 and n is an integer in the range of 1 to about 2, such that the sum of n and m is 3; J is nothing or —CH$_2$—; each R$^2$ is independently hydrogen, an alkyl group having from one to about three carbon atoms, or an alkyl group, which alkyl or aryl groups are substituted or unsubstituted with groups that do not interfere undesirably with polyurethane formation; each R$^3$ is independently a halogen-substituted alkyl group or a halogen atom; and R$^4$ is an alkyl group which is unsubstituted or substituted with groups which do not interfere undesirably with polyurethane formation; (d) polysubstituted alkyl diamines having at least one highly electronegative group geminate to each amine group; (e) alkyl acid esters of halogen substituted diamino phenols having a structure represented by Formula V:

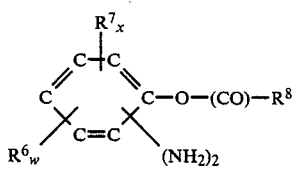

wherein w is an integer in the range of about 0 to about 2 and x is an integer in the range of 1 to about 3, such that the sum of w and x is 3; each R$^6$ is independently hydrogen, an alkyl group having from one to about three carbon atoms, or an aryl group, which alkyl or aryl groups are unsubstituted or substituted with groups which do not interfere undesirably with polyurethane formation; each R$^7$ is independently a halogen-substituted alkyl group or a halogen atom; and R$^8$ is an alkyl group which is unsubstituted or substituted with groups which do not interfere undesirably with polyurethane formation; and (f) mixtures thereof.

2. The process of claim 1 wherein at least one relatively high equivalent weight compound is a polyether polyol.

3. The process of claim 1 wherein at least one relatively high equivalent weight compound is a polyester polyol produced from oxiranes.

4. The process of claim 1 wherein at least one relatively high equivalent weight compound is an aminated polyether polyol.

5. The process of claim 1 wherein at least one relatively high equivalent weight compound is an aminated polyester polyol.

6. The process of claim 1 wherein at least one polyisocyanate component is toluene diisocyanate.

7. The process of claim 1 wherein at least one polyisocyanate component is diphenylmethane-4,4'-diisocyanate, diphenylmethane-2,4'-diisocyanate, or polymethylene polyphenylisocyanate.

8. The process of claim 1 wherein the chain extender is a heterocyclic diamine and has a structure represented by Formula I:

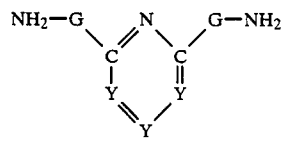

wherein each G is a divalent bridging group or a covalent bond; each Y is independently nitrogen or a =CR— group, but at least one Y is a =CR— group, wherein each R is independently hydrogen, an alkyl group or an aryl group which groups are unsubstituted or substituted with groups which do not interfere undesirably with polyurethane formation.

9. The process of claim 8 wherein the chain extender is 2,6-diaminopyridine, or 2,6-diaminopyrazine, or 2,6-diaminopyrimidine, or 2,6-diamino-4-phenyl-s-triazine.

10. The process of claim 1 wherein the di(aromatic amine) disulfide and has a structure represented by Formula II:

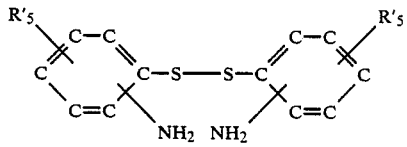

wherein each R' is independently (a) hydrogen, (b) an alkyl group having from one to about three carbon atoms, or (c) an aryl group, which alkyl groups (b) or aryl groups (c) are unsubstituted or are substituted with groups which do not interfere undesirably with polyurethane formation.

11. The process of claim 10 wherein both amine groups are para to the disulfide group.

12. The process of claim 11 wherein the di(aromatic amine) disulfide is di(para-aminophenyl)disulfide.

13. The process of claim 1 wherein the chain extender is an alkyl ether of halogen-substituted aromatic diamine and has a structure represented by Formula III

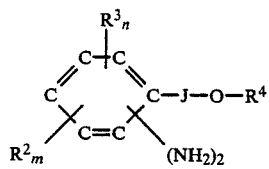

wherein m is an integer in the range of 0 to about 2 and n is an integer in the range of 1 to about 2, such that the sum of n and m is 3; J is nothing or —$CH_2$—; each $R_2$ is independently hydrogen, an alkyl group having from one to about three carbon atoms, or an aryl group, which alkyl or aryl groups are unsubstituted or substituted with groups which do not interfere undesirably with polyurethane formation; each $R^3$ is independently a halogen-substituted alkyl group or a halogen atom; and $R^4$ is an alkyl group which is unsubstituted or substituted with groups which do not interfere undesirably with polyurethane formation.

14. The process of claim 13 wherein each $R^2$ group is H.

15. The process of claim 13 wherein each $R^3$ group is a perfluoroalkyl group.

16. The process of claim 13 wherein the chain extender is an alkyl ether of a halogen-substituted aromatic diamine of Formula III and each amine group is adjacent the ether group.

17. The process of claim 16 wherein the alkyl ether of a halogen-substituted aromatic diamine is 1-chloro-4-trifluoromethoxy-2,6-diaminobenzene.

18. The process of claim 1 wherein the chain extender is a polysubstituted alkyl diamine represented by Formula IV:

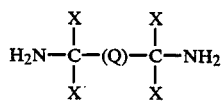

wherein Q is $(CX_2)q$—, —$(CX_2)_r$—Ar—$(CX_2)s$—; q, s and r are integers in the range of 0 to about 4 and each X group is independently Z or is a branched or straight chain alkyl group represented by the formula —$C_tZ_{(2t+1)}$—, where each Z is independently hydrogen, a halogen, a perhalogenated methyl group, or a cyano group, and t is an integer in the range of 1 to about 2; wherein at least one X group geminate to each amino group is not hydrogen: and Ar is divalent aromatic radical which is unsubstituted or substituted with groups which do not interfere undesirably with polyurethane formation.

19. The process of claim 1 wherein the chain extender is an alkyl acid ester of a halogen-substituted diamino phenol and has a structure represented by Formula V

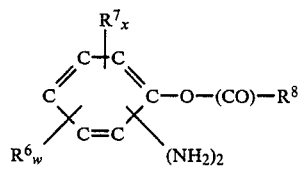

wherein w is an integer in the range of about 0 to about 2 and x is an integer in the range of 1 to about 3, such that the sum of w and x is 3; each $R^6$ is independently hydrogen, an alkyl group having from one to about three carbon atoms, or an aryl group, which alkyl or aryl groups are unsubstituted or substituted with groups which do not interfere undesirably with polyurethane formation; each $R^7$ is independently a halogen-substituted alkyl group or a halogen atom; and $R^8$ is an alkyl group which is unsubstituted or substituted with groups which do not interfere undesirably with polyurethane formation.

20. The process of claim 19 wherein each $R^6$ is hydrogen, each $R^7$ is chlorine, and each amino group is ortho to the ester group.

21. The process of claim 19 wherein $R^8$ is trifluoromethyl.

22. The process of claim 19 wherein the alkyl acid ester of a diamino phenol is 2,6 diamino-4-chloro-1-perfluoroacetate.

23. The process of claim 1 wherein the reaction mixture additionally comprises a second chain extender.

24. The process of claim 1 wherein the process is a one-shot process.

25. The process of claim 10 wherein the process is a one-shot process.

26. The process of claim 8 wherein G is selected from the group consisting of unsubstituted or inertly substituted alkyl, aryl, alkylaryl groups and a covalent bond.

27. A process for producing a polyurethane or polyurethane-polyurea by polymerizing a reaction mixture comprising (1) at least one polyisocyanate component; (2) at least one relatively high equivalent eight active hydrogen component; and (3) at least one chain extender selected from the group consisting of: (a) heterocyclic diamines having a structure represented by Formula I:

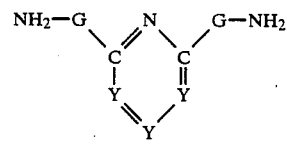

wherein each G is a divalent bridging group selected from the group consisting of unsubstituted or inertly substituted alkyl, aryl, alkylaryl groups and a covalent bond; each Y is independently nitrogen or a =CR— group, but at least one Y is a =CR— group and at least one Y is a nitrogen atom, wherein each R is independently hydrogen, an alkyl group or an aryl group which groups are unsubstituted or substituted with groups which do not interfere undesirably with polyurethane formation; (b) polysubstituted alkyl diamines having at least one highly electronegative group geminate to each amino group; and (c) alkyl acid esters of halogen substituted diamino phenols having a structure represented by Formula V:

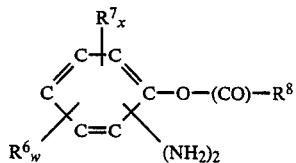

wherein w is an integer in the range of about 0 to about 2 and x is an integer in the range of 1 to about 3, such that the sum of w and x is 3; each $R^6$ is independently hydrogen, an alkyl group having from one to about three carbon atoms, or an aryl group, which alkyl or aryl groups are unsubstituted or substituted with groups which do not interfere undesirably with polyurethane formation; each $R^7$ is independently a halogen-substituted alkyl group or a halogen atom; and $R^8$ is an alkyl group which is unsubstituted or substituted with groups which do not interfere undesirably with polyurethane formation; and (d) mixtures thereof wherein component (2) and chain extender (3) are mixed together and subsequently mixed with polyisocyanate component (1).

28. A composition of matter comprising (1) a relatively high equivalent weight polyfunctional active hydrogen component; (2) a chain extender selected from the group consisting of: (a) heterocyclic diamines having a structure represented by Formula I:

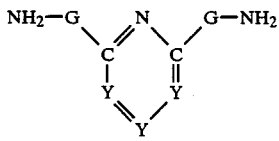

wherein each G is a divalent bridging group selected from the group consisting of unsubstituted or inertly substituted alkyl, aryl, alkylaryl groups and a covalent bond; each Y is independently nitrogen or a =CR— group, but at least one Y is a =CR— group and at least one Y is a nitrogen atom, wherein each R is independently hydrogen, an alkyl group or an aryl group which groups are unsubstituted or substituted with groups which do not interfere undesirably with polyurethane formation; (b) polysubstituted alkyl diamines having at least one highly electronegative group geminate to each amino group; (c) alkyl acid esters of halogen substituted diamino phenols having a structure represented by Formula V:

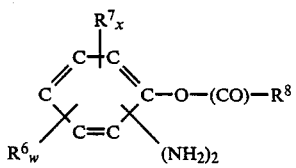

wherein w is an integer in the range of about 0 to about 2 and x is an integer in the range of 1 to about 3, such that the sum of w and x is 3; each $R^6$ is independently hydrogen, an alkyl group having from one to about three carbon atoms, or an aryl group, which alkyl or aryl groups are unsubstituted or substituted with groups which do not interfere undesirably with polyurethane formation; each $R^7$ is independently a halogen-substituted alkyl group or a halogen atom; and $R^8$ is an alkyl group which is unsubstituted or substituted with groups which do not interfere undesirably with polyurethane formation and (d) mixtures thereof; and (3) at least one polyisocyanate component wherein component (1) and chain extender (2) are mixed together and subsequently mixed with polyisocyanate component (3).

29. A polyurethane or polyurethane-polyurea polymer produced by subjecting to a reaction injection molding process, a reaction mixture comprising (1) at least one polyisocynate component; (2) at least one relatively high equivalent weight active hydrogen component; and (3) a chain extender selected from the group consisting of: (a) heterocyclic diamines having a structure represented by Formula I:

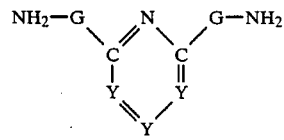

wherein each G is a divalent bridging group or a covalent bond; each Y is independently nitrogen or a =CR— group, but at least one Y is a =CR— group, wherein each R is independently hydrogen, an alkyl group or an aryl group which groups are unsubstituted or substituted ith groups which do not interfere undesirably with polyurethane formation; (b) di(aromatic amine) disulfides; (c) alkyl ethers of halogen-substituted aromatic diamines having a structure represented by Formula III:

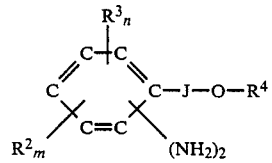

wherein m is an integer in the range of 0 to about 2 and n is an integer in the range of 1 to about 2, such that the sum of n and m is 3; J is nothing or —$CH_2$—; each $R^2$ is independently hydrogen, an alkyl group having from one to about three carbon atoms, or an aryl group, which alkyl or aryl groups are unsubstituted or substituted with groups which do not interfere undesirably with polyurethane formation; each $R^3$ is independently a halogen-substituted alkyl group or a halogen atom; and $R^4$ is an alkyl group which is unsubstituted or substituted with groups which do not interfere undesirably with polyurethane formation; (d) polysubstituted alkyl diamines having at least one highly electronegative group geminate to each amine group; (e) alkyl acid esters of halogen substituted diamino phenols having a structure represented by Formula V:

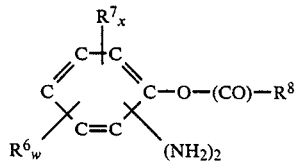

wherein w is an integer in the range of about 0 to about 2 and x is an integer in the range of 1 to about 3, such that the sum of w and x is 3; each $R^6$ is independently hydrogen, an alkyl group having from one to about three carbon atoms, or an aryl group, which alkyl or aryl groups are unsubstituted or substituted with groups which do not interfere undesirably with polyurethane formation; each $R^7$ is independently a halogen-substituted alkyl group or halogen atom; and $R^8$ is an alkyl group which is unsubstituted or substituted with groups which do not interfere undesirably with polyurethane formation and (f) mixtures thereof.

30. A polyurethane or polyurethane-polyurea produced by polymerizing a reaction mixture comprising (1) at least one polyisocyanate component; (2) at least one relatively high equivalent weight active hydrogen component; and (3) at least one chain extender selected from the group consisting of: (a) heterocyclic diamines having a structure represented by Formula I:

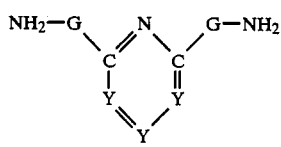

wherein each G is a divalent bridging group selected from the group consisting of unsubstituted or inertly substituted alkyl, aryl, alkylaryl groups and a covalent bond; each Y is independently nitrogen or a =CR— group, but at least one Y is a =CR— group and at least one Y is a nitrogen atom, wherein each R is independently hydrogen, an alkyl group or an aryl group which groups are unsubstituted or substituted with groups which do not interfere undesirably with polyurethane formation; (b) polysubstituted alkyl diamines having at least one highly electronegative group geminate to each amino group; and (c) alkyl acid esters of halogen substituted diamino phenols having a structure represented by Formula V:

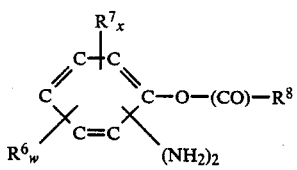

wherein w is an integer in the range of about 0 to about 2 and x is an integer in the range of 1 to about 3, such that the sum of w and x is 3; each $R^6$ is independently hydrogen, an alkyl group having from one to about three carbon atoms, or an aryl group, which alkyl or aryl groups are unsubstituted or substituted with groups which do not interfere undesirably with polyurethane formation; each $R^7$ is independently a halogen-substituted alkyl group or a halogen atom; and $R^8$ is an alkyl group which is unsubstituted or substituted with groups which do not interfere undesirably with polyurethane formation and (d) mixtures thereof.

31. The composition of claim 28 wherein the chain extender is a heterocyclic diamine having a structure represented by Formula I wherein at least one Y is nitrogen or mixtures thereof.

32. The composition of claim 28 wherein the chain extender is an alkyl acid ester of a halogen-substituted diamino phenol having a structure represented by Formula V.

33. The polyurethane or polyurethane-polyurea of claim 29 wherein the chain extender is a heterocyclic diamine having a structure represented by Formula I wherein G is selected from the group consisting of unsubstituted or inertly substituted alkyl, aryl, alkylaryl groups and a covalent bond.

34. The polyurethane or polyurethane-polyurea of claim 29 wherein the chain extender is an alkyl acid ester of a halogen-substituted diamino phenol having a structure represented by Formula V.

35. The polyurethane or polyurethane-polyurea of claim 29 wherein the chain extender is an alkyl ether of a halogen-substituted aromatic diamine having a structure represented by Formula III.

36. The polyurethane or polyurethane-polyurea of claim 29 wherein the chain extender is a polysubstituted alkyl diamine having at least one highly electronegative group geminate to each amine group and having a structure represented by Formula IV:

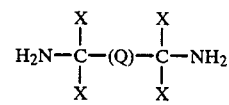

wherein Q is $(CX_2)_q$—, —$(CX_2)_r$—Ar—$(CX_2)_s$—; q, s and r are integers in the range of 0 to about 4 and each X group is independently Z or is a branched or straight chain alkyl group represented by the formula —$C_tZ_{(2t+1)}$—, where each Z is independently hydrogen, a halogen, a perhalogenated methyl group, or a cyano group, and t is an integer in the range of 1 to about 2; wherein at least one X group germinate to each amino group is not hydrogen; and Ar is a divalent aromatic radical which is unsubstituted or substituted with groups which do not interfere undesirably with polyurethane formation.

37. The polyurethane or polyurethane-polyurea of claim 29 wherein the chain extender is a di(aromatic amine) disulfide having a structure represented by Formula IV:

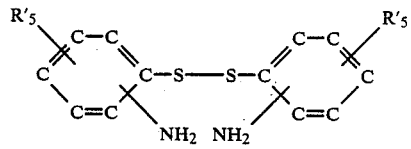

wherein each R' is independently (a) hydrogen, (b) an alkyl group having from one to about three carbon atoms, or (c) an aryl group, which alkyl groups (b) or aryl groups (c) are unsubstituted or are substituted with groups which do not interfere undesirably with polyurethane formation.

38. The process of claim 30 herein the highly electronegative groups geminate to each amino group in chain extender (b) are independently selected from the group consisting of halogen atoms, perhaloalkyl groups, nitro groups, and cyano groups.

* * * * *